United States Patent
Hally et al.

(10) Patent No.: US 11,221,862 B2
(45) Date of Patent: Jan. 11, 2022

(54) CAPTURING DATA FROM A LIVE WEB APPLICATION TO POPULATE A DEMO APPLICATION

(71) Applicant: EMC IP Holding Company LLC, Hopkinton, MA (US)

(72) Inventors: Aidan Hally, Cork (IE); Conor E. O'Mahony, Lehenaghbeg (IE); Caroline O'Connell, Cork (IE)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 58 days.

(21) Appl. No.: 16/365,102

(22) Filed: Mar. 26, 2019

(65) Prior Publication Data
US 2020/0310833 A1 Oct. 1, 2020

(51) Int. Cl.
*G06F 9/451* (2018.01)
*G06F 3/048* (2013.01)
*G06F 3/0488* (2013.01)

(52) U.S. Cl.
CPC .......... *G06F 9/451* (2018.02); *G06F 3/0488* (2013.01)

(58) Field of Classification Search
CPC .......... G06F 11/36; G06F 40/103; G06F 9/45; G06F 3/06; G06F 3/00; G06F 3/048; G06F 9/451; G06F 3/0488; H04L 67/02; H04L 67/42; H04L 63/1425
See application file for complete search history.

(56) References Cited

U.S. PATENT DOCUMENTS

| | | | |
|---|---|---|---|
| 8,504,758 B1* | 8/2013 | McHugh | G06F 3/0652 711/100 |
| 2003/0028752 A1* | 2/2003 | Fu | G06F 16/10 712/200 |
| 2003/0033283 A1* | 2/2003 | Evans | H04L 67/2847 |
| 2006/0212324 A1* | 9/2006 | Okman | G06F 11/3438 345/440 |
| 2011/0035205 A1* | 2/2011 | Brideson | G06F 11/3414 703/22 |
| 2011/0078114 A1* | 3/2011 | Herbeck | G06F 16/38 707/638 |
| 2014/0223418 A1* | 8/2014 | Michelsen | G06F 11/3668 717/135 |
| 2015/0086115 A1* | 3/2015 | Danko | G06K 9/6201 382/190 |
| 2016/0034383 A1* | 2/2016 | Duan | G06F 11/3688 717/131 |
| 2017/0357519 A1* | 12/2017 | Kitahashi | G06F 3/04817 |
| 2018/0034721 A1* | 2/2018 | Dunn | H04L 67/2857 |
| 2019/0318020 A1* | 10/2019 | Chauhan | G06F 16/258 |
| 2020/0293541 A1* | 9/2020 | Pigeon | G06F 9/541 |

\* cited by examiner

*Primary Examiner* — Hugo Molina

(74) *Attorney, Agent, or Firm* — Amin, Turocy & Watson, LLP

(57) ABSTRACT

Data can be captured from a live web application to populate a demo application. In an example, automated input is provided to user interface touch points of a live application, and corresponding responses are captured. These responses are reformatted into a convention of the demo application, and used to populate demo response files. Then, when a demo application operates, it retrieves, processes, and displays information in these demo response files.

20 Claims, 13 Drawing Sheets

400

| Name | HEADERS 404 | RESPONSE 406 |
|---|---|---|
| COMMAND 402 COMMAND | [illegible response headers and payload text] 408 | |

COMMAND 702
COMMAND

HEADERS 704    RESPONSE 706

CAPTURING DATA FROM A LIVE WEB APPLICATION TO POPULATE A DEMO APPLICATION

TECHNICAL FIELD

The present application relates generally to techniques for capturing data from an application, and more specifically, for capturing data from a live web application, and then populating a demo application with that captured data.

BACKGROUND

A web application generally can comprise a computer application manifested in a web page that is rendered by a web browser. A live web application can refer to a web application that processes live data, such as information about the status of a computer network. A demo application generally can comprise an application that provides a demonstration of the features of a full application, such as a live web application. In some examples, a demo application can process demonstration data, rather than, e.g., information about the current status of an actual computer network.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which:

FIG. 4 illustrates an example response generated based on a UI interaction in the example UI interface of FIG. 3, in accordance with certain embodiments of this disclosure;

FIG. 6 illustrates a second example UI for a live application, in accordance with certain embodiments of this disclosure;

FIG. 7 illustrates an example response generated based on a UI interaction in the example UI interface of FIG. 6, in accordance with certain embodiments of this disclosure;

DETAILED DESCRIPTION

Overview

Figure 1:
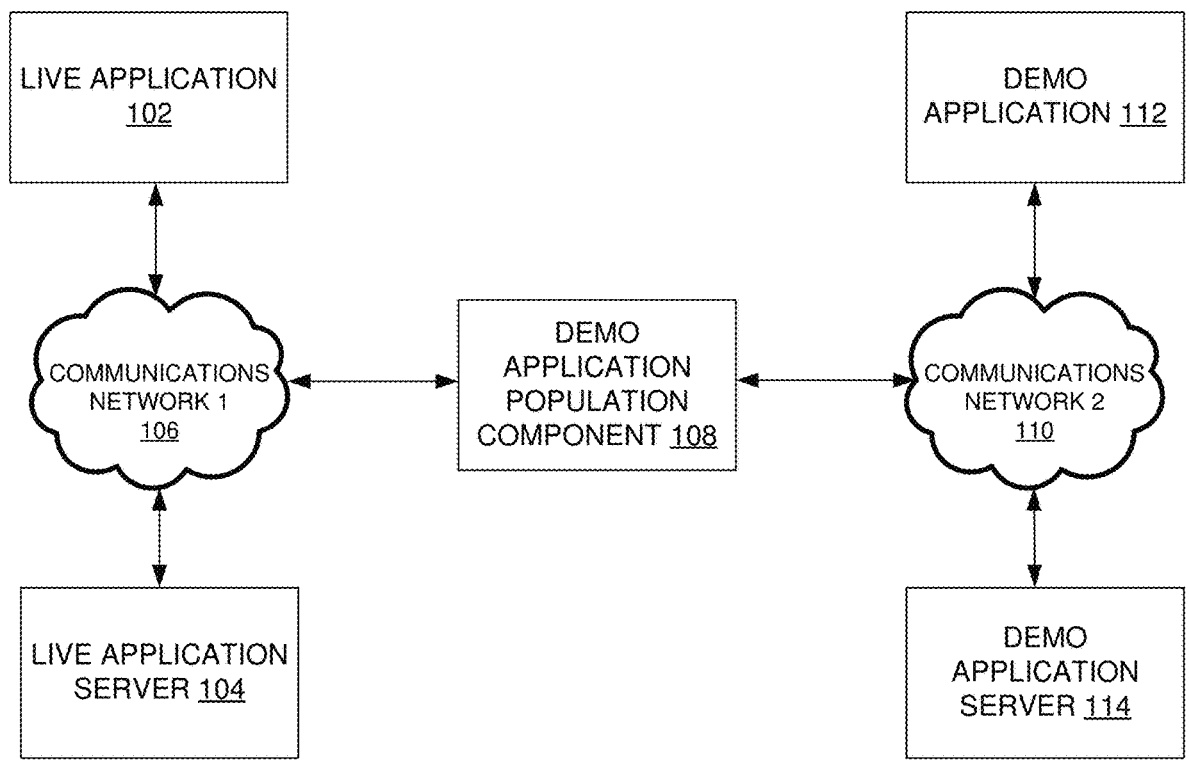
FIG. 1 illustrates a block diagram of an example computer system that can facilitate capturing data from a live web application to populate a demo application, in accordance with certain embodiments of this disclosure.

The present disclosure comprises techniques that allow a user to capture and further utilize data (e.g., in a file format such as a JavaScript Object Notation (JSON) file format) that has been generated from a live web application.

Previous techniques involve creating and maintaining a product demonstration application. This demo application can mimic the UI and functionality of a corresponding live application, and can be used to get a feel for a live application (such as a new version of a live application). In some examples, the demo application can be used by users, who can provide feedback about the application, which can be provided back to a corresponding development team, which can make improvements to the application.

In some examples, the demo application can be designed and constructed to mimic the look and feel of the corresponding live application as far as practically possible. To achieve this in previous techniques, developers undertake a laborious and time-consuming task of gathering the live application's data and manually loading it into the demo application. Then, every time a change is made to the live application, the demo application's data needs to be updated manually. These previous techniques can have the problem of being slow, being labor-intensive, and being prone to human error. A solution to these problems is found in the present techniques, which can be used to both automate data capture and update the demonstration application with a minimum of human involvement.

Example Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 illustrates a block diagram of an example computer system 100 that can facilitate capturing data from a live web application to populate a demo application, in accordance with certain embodiments of this disclosure.

In some examples, the present techniques can comprise several different parts that can work together in one process, such as demo application population component 108. Under previous techniques, when a demo application is to be updated, a developer must first spin up and initialize the real application (or live application). The developer then selects the UI component—such as a view, a dialog, or a button—that the developer would like to gather data from. The developer can utilize a developer tools application (such as a Chrome DevTools developer tool, or similar) for data gathering. The developer can manually interact with the live application UI, causing the live application to issue a corresponding JSON request, which can be recorded by the developer tools application.

Then, the developer can navigate to the developer tools application, manually locate the applicable request from a list, navigate to the developer tools application's response tab, and find the corresponding response. This response can be packaged into the demo application to provide the same behavior in the demo application as in the corresponding live application. Once the response is located, the developer can create a new file in the demo application's code base, and can copy and paste the response into this new file. This process can be carried out by hand for each UI change made to the live application. For a large application, this can involve manually creating hundreds, or even thousands, or response files.

The present techniques can provide ways to automate aspects of this laborious task with a minimum of developer input. In examples, a UI automation tool (such as a Selenium automation tool) can be invoked to automatically interact with each touch point of a UI of the live application that initializes a request, causing the live application to create a corresponding response for each such interaction. While the automated UI interactions are being performed, a separate information-collection process can be listening to the network traffic of a web browser in which the live application executes, and this information-gathering process can gather the responses as they are generated. The information-collection process can then generate files (such as JSON files) in a relevant package of a code base of the demo application, and add the responses to these newly created files.

Once the automation and information-collection process is complete, the data reflected in the demo application UI can mirror that of the data reflected in the live application UI. The automation and information-collection process can be packaged as a single application, such as demo application population component 108.

Computer system 100 comprises live application 102, live application server 104, communication network 1 106, demo application population component 108, communications network 2 110, demo application 112, and demo server 114.

It can be appreciated that these parts of computer system 100 are depicted logically, and as one example, and that there can be other embodiments used to effectuate the present techniques. For instance, in some examples, communication network 1 106 and communication network 2 110 can be the same communication network. Additionally, in some examples, both demo application 112 and demo application server 114 can be effectuated on one computer, such as via separate virtual machine instances for each of demo application 112 and demo application server 114.

Figure 13:
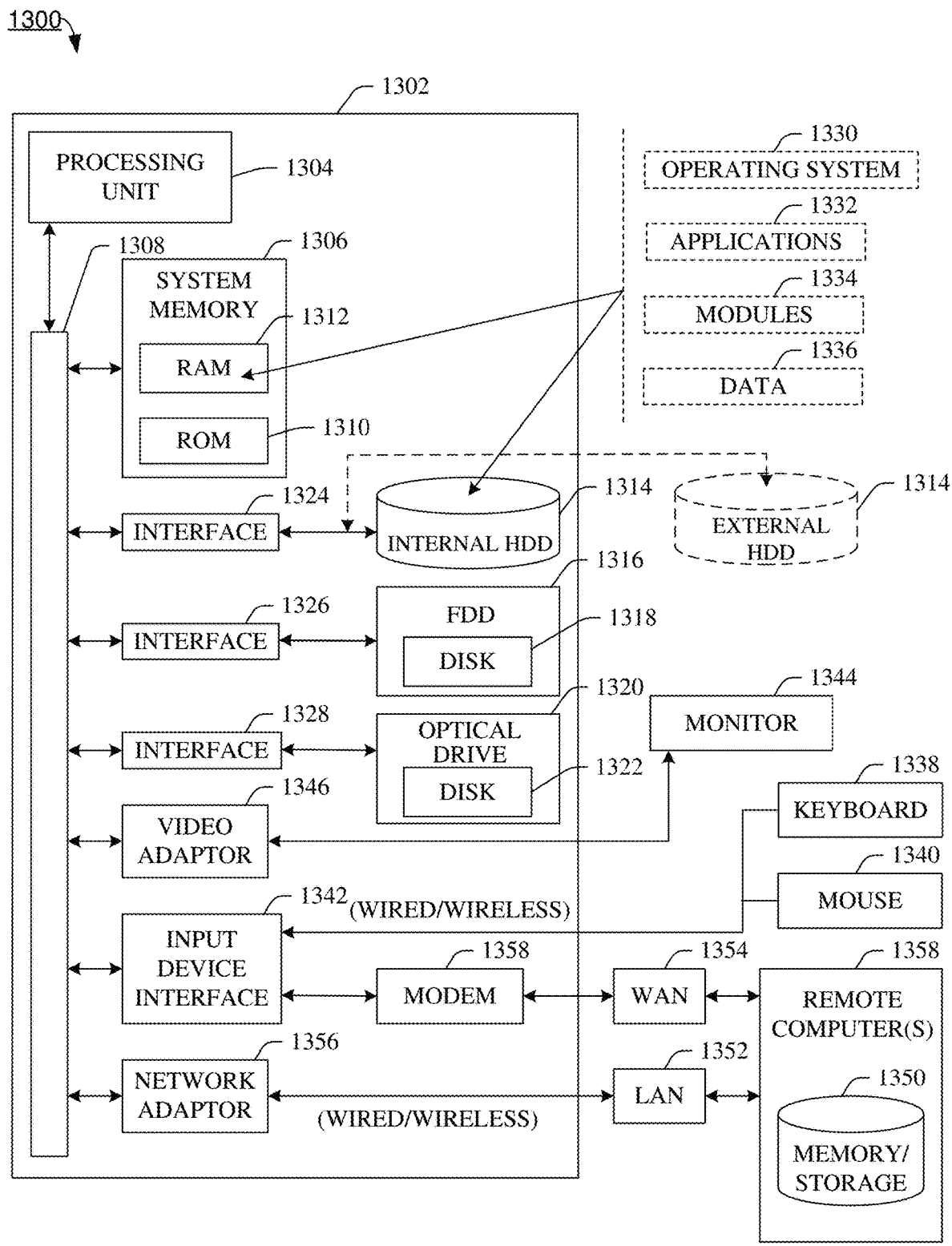
FIG. 13 illustrates an example block diagram of a computer operable to execute certain embodiments of this disclosure.

Aspects of live application 102, live application server 104, demo application population component 108, demo application 112, and demo application server 114 can be implemented with one or more instances of computer 1302 of FIG. 13, or aspects of computer 1302 of FIG. 13. Communication network 1 106 and communication network 2 110 can each comprise a computer communications network, such as an internet (including the Internet), or an intranet).

Live application 102 can comprise a live web application that is presented in a web browser of a computer. Live application 102 can be considered to be live because it presents data that reflects the current state of something, such as the current state of one or more computers monitored by live application server. Live application 102 can be configured to communicate with live application server 104 via communication network 1 106. Live application server 104 can comprise a computer that is configured to receive requests for data from live application 102, and respond to live application 102 with a corresponding response.

Demo application population component 108 can be configured to communicate with live application 102 via communications network 1 106. Demo application population component 108 can send data indicative of triggering, or interacting with, certain UI elements of live application 102. In response to having these UI elements triggered, live application 102 can send a request to live application server 104. Live application server 104 can generate a corresponding response and send this response back to live application 102.

This communication from live application server 104 to live application 102 can be monitored by demo application population component 108, and the response captured by demo application population component 108 (the same response can both be captured and still received by live application 102). Demo application population component 108 can store one or more of these responses.

Demo application population component 108 also can format these responses into new response files for demo application 112. In an example, this formatting can comprise modifying at least a portion of a response to adhere to a naming convention of demo application 112. Demo application population component 108 can then send these responses to demo application server 114 via communications network 2 110. When demo application 112 sends requests to demo application server 114 via communications network 2 110, demo application server 114 can respond with the responses received from demo application population component 108.

Figure 2:
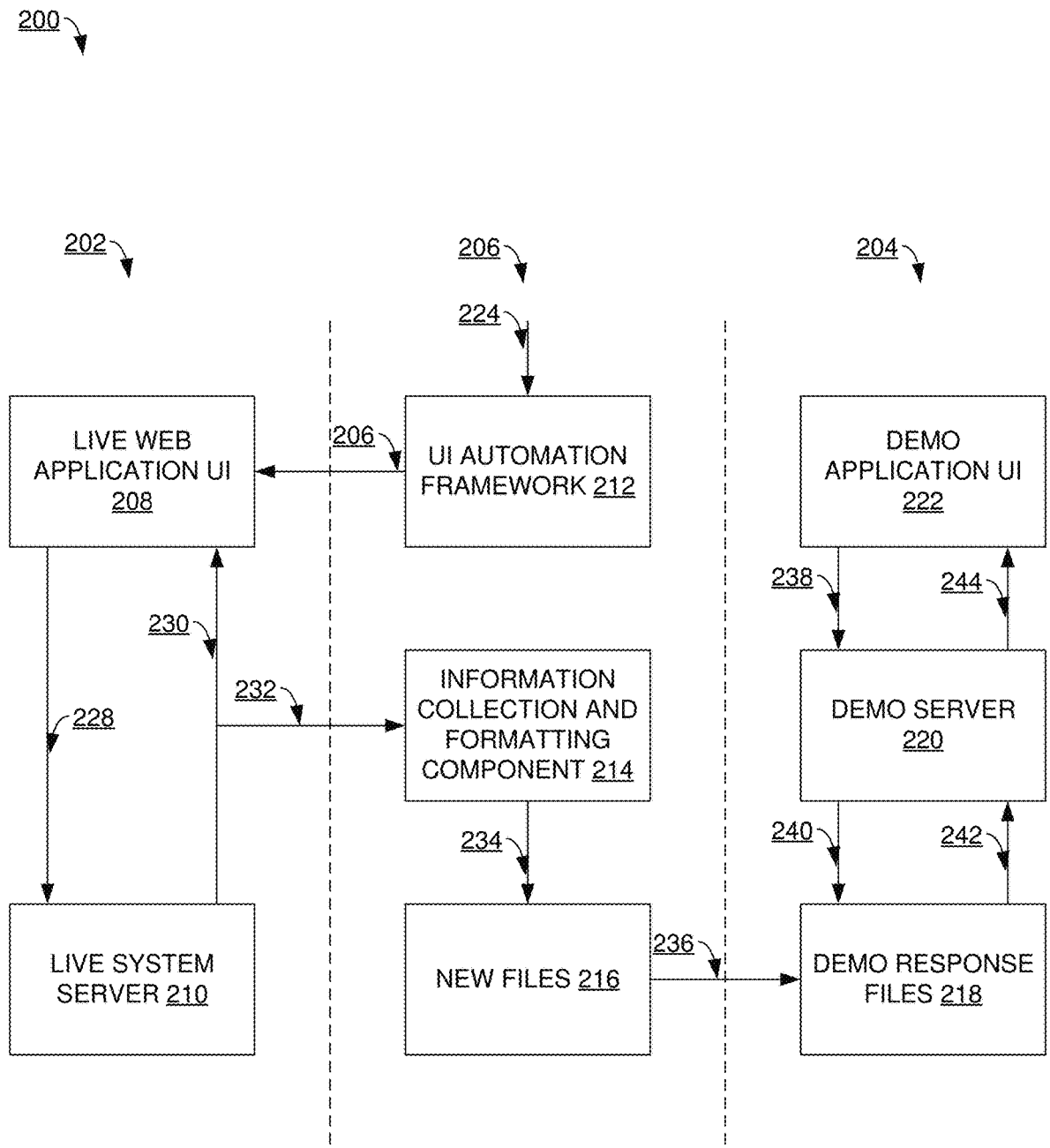
FIG. 2 illustrates another block diagram of an example computer system that can facilitate capturing data from a live web application to populate a demo application, in accordance with certain embodiments of this disclosure.

FIG. 2 illustrates another block diagram of an example computer system 200 that can facilitate capturing data from a live web application to populate a demo application, in accordance with certain embodiments of this disclosure. In some examples, computer system 200 can illustrate more detail of aspects of computer system 100 of FIG. 1. Computer system 200 comprises live application 202, demo application 204, and automated data collection component 206. In some examples, live application 202 can be similar to live application 102 and live application server 104; demo application 204 can be similar to demo application 102 and demo application server 114; and automated data collection component 206 can be similar to demo application population component 108.

Live application 202 comprises live web application UI 208 and live system server 210. Demo application 204 comprises demo application UI 222, demo server 220, and demo response files 218. Automated data collection component 206 comprises UI automation framework 212, information collection and formatting component 124, and new files 234. Each of live application 202, demo application 204, and automated data collection component 206 can be implemented with one or more instances of computer 1302 of FIG. 13, or aspects of computer 1302 of FIG. 13.

Initialize data capture component 224 can comprise user input received at automated data collection component 206 that causes automated data collection component 206 (and UI automation framework 212) to be invoked. UI automation framework 212 can be configured to invoke UI interactions at live web application UI 208, by sending automated UI interactions 226 to live web application UI 208. Live web application UI 208 can comprise a web application UI that is rendered in a web browser window.

In response to receiving send automated UI interactions 226, live web application UI 208 can send UI request to server 228 to live system server 210. Live system server 210 can process this request, determine a response, and send response from server 230 to live web application UI 208. Responses like this can be monitored by automated data collection component 206, as shown with retrieve responses 232, which is received by information collection and formatting component 214 of automated data collection component 206. Information collection and formatting component 214 is configured to both retrieve responses from live system server 210, and format those responses for demo application 204. In an example, Information collection and formatting component 214 can format those responses by modifying the responses from a naming convention for live application 202 to a naming convention for demo application 204. Information collection and formatting component 214 then outputs 234 new files 216.

Automated data collection component 206 replaces existing responses 236 in demo application 204. In an example, automated data collection component 206 can send the new responses to demo application 204 across a communications network, where they can be stored in a known location, such as a computer storage that stores demo response files 218. In some examples, existing files in demo response files 218 can be replaced with these new files.

When the new files are stored at demo response files 218, demo application UI 222 can make requests that result in receiving one or more of those files as a response. Demo application UI 222 can make request to server 238 to demo server 220, and this request to server 238 can be similar to UI request to server 228. In response to receiving request to server 238, demo server 220 can make a corresponding request file 240 to demo response files 218. In an example, request file 240 can comprise demo server 220 locating a file that corresponds to request to server 238 in a database or data store that demo server 220 has access to. Request file 240 can result in receive file 242, which can comprise the file identified in request file 240. Demo server 220 can receive the file in receive file 242, and from that file, produce a response that is sent back to demo application UI 222 as response from server 244. Demo application UI 222 can use this response to present information corresponding to the response in a UI of demo application UI, such as a web page that is rendered in a web browser.

In some examples, these various data flows (E.g., initiate data capture component 224 and send automated UI interactions 226) can be sent between computers across a communications network, or sent between components within a single computer.

Example User Interfaces and Responses

Figure 3:
FIG. 3 illustrates an example user interface (UI) for a live application, in accordance with certain embodiments of this disclosure.

FIG. 3 illustrates an example UI 300 for a live application, in accordance with certain embodiments of this disclosure. UI 300 can comprise a UI that is displayed as part of a live application (such as live application 102 of FIG. 1) or a demo application (such as demo application 112). UI 300 can comprise UI elements that can be invoked by a demo application population component (such as demo application population component 108) to cause an application associated with UI 300 to send a request to a server (such as live application server 104). UI 300 comprises two UI elements that can be manipulated or invoked—UI element 302 and UI element 304.

FIG. 4 illustrates an example response 400 generated based on a UI interaction in the example UI interface of FIG. 3, in accordance with certain embodiments of this disclosure. The response of response 400 can be generated by a server in response to a UI interaction in UI 300 (such as an interaction with UI element 302 of UI 300). Response 400 comprises a user interface in which responses list 402 is shown. For a particular response in responses list 402, headers 404 and response 406 can be selected. As depicted in response 400, headers 404 is selected, and headers 408 is depicted as a result.

Figure 5:
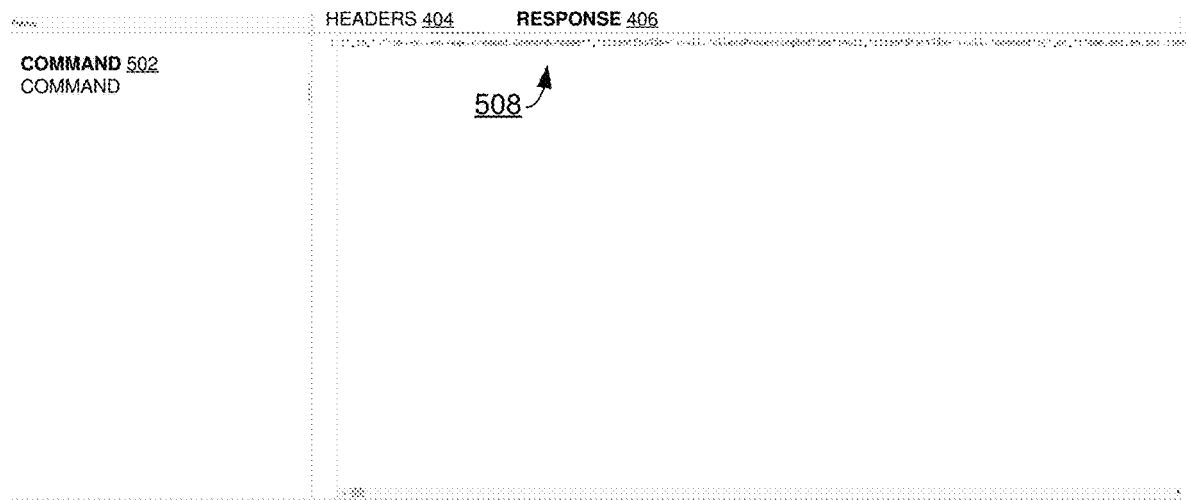
FIG. 5 illustrates more of an example response generated based on a UI interaction in the example UI interface of FIG. 3, in accordance with certain embodiments of this disclosure.

FIG. 5 illustrates more of an example response 500 generated based on a UI interaction in the example UI interface of FIG. 3, in accordance with certain embodiments of this disclosure. As with response 400, response 500 can be generated by a server in response to a UI interaction in UI 300 (such as an interaction with UI element 302 of UI 300). Response 500 comprises a user interface in which responses list 502 is shown. For a particular response in responses list 502, headers 504 and response 506 can be selected. As depicted in response 500, response 506 is selected, and response 506 is depicted as a result. Response 506 and headers 404 can be the respective response and headers to a single response.

Figure 6:
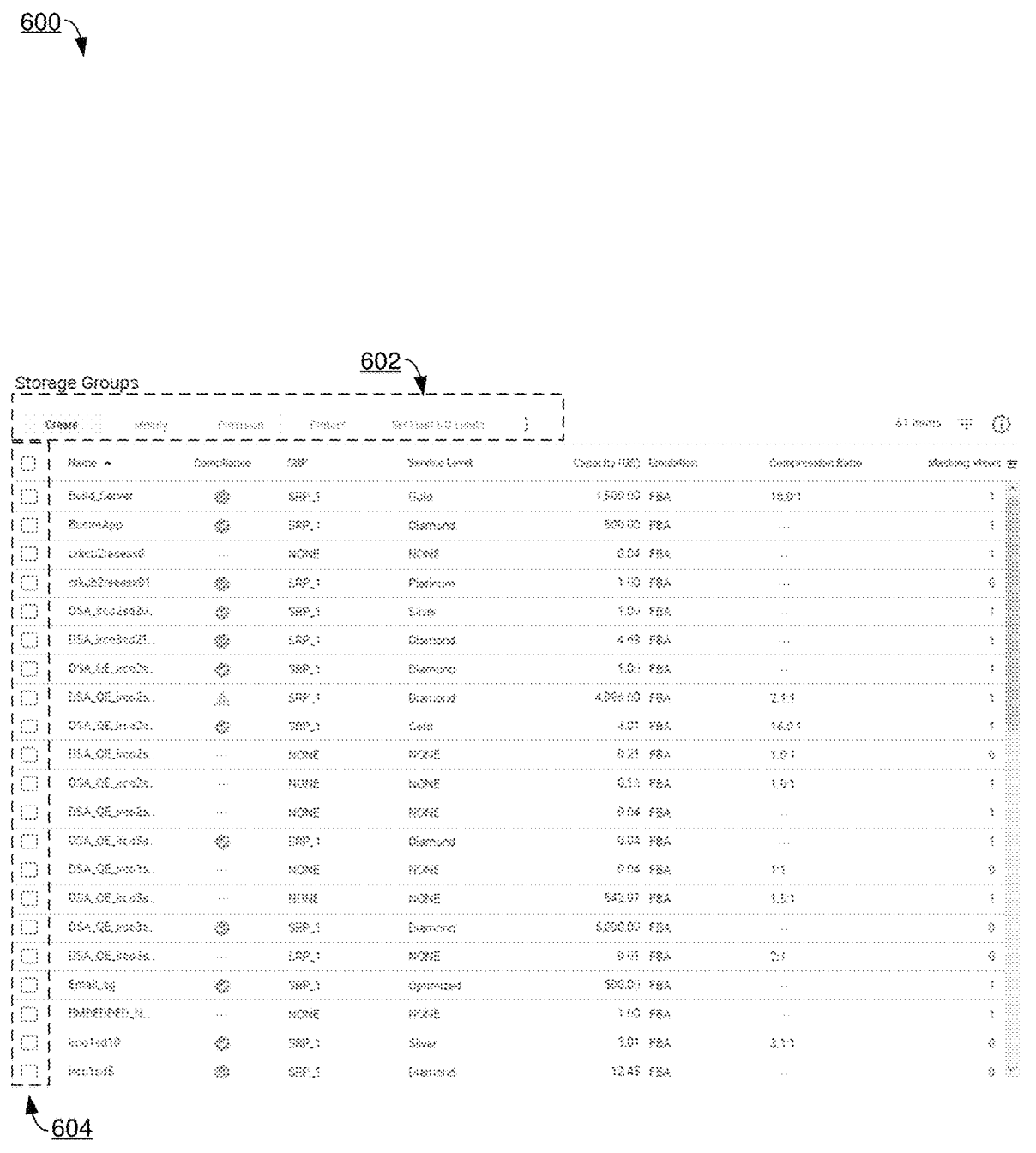

FIG. 6 illustrates a second example UI 600 for a live application, in accordance with certain embodiments of this disclosure. UI 600 can comprise a UI that is displayed as part of a live application (such as live application 102 of FIG. 1) or a demo application (such as demo application 112). UI 600 can comprise UI elements that can be invoked by a demo application population component (such as demo application population component 108) to cause an application associated with UI 600 to send a request to a server (such as live application server 104). UI 600 comprises two UI elements that can be manipulated or invoked—UI element 602 and UI element 604.

Figure 7:
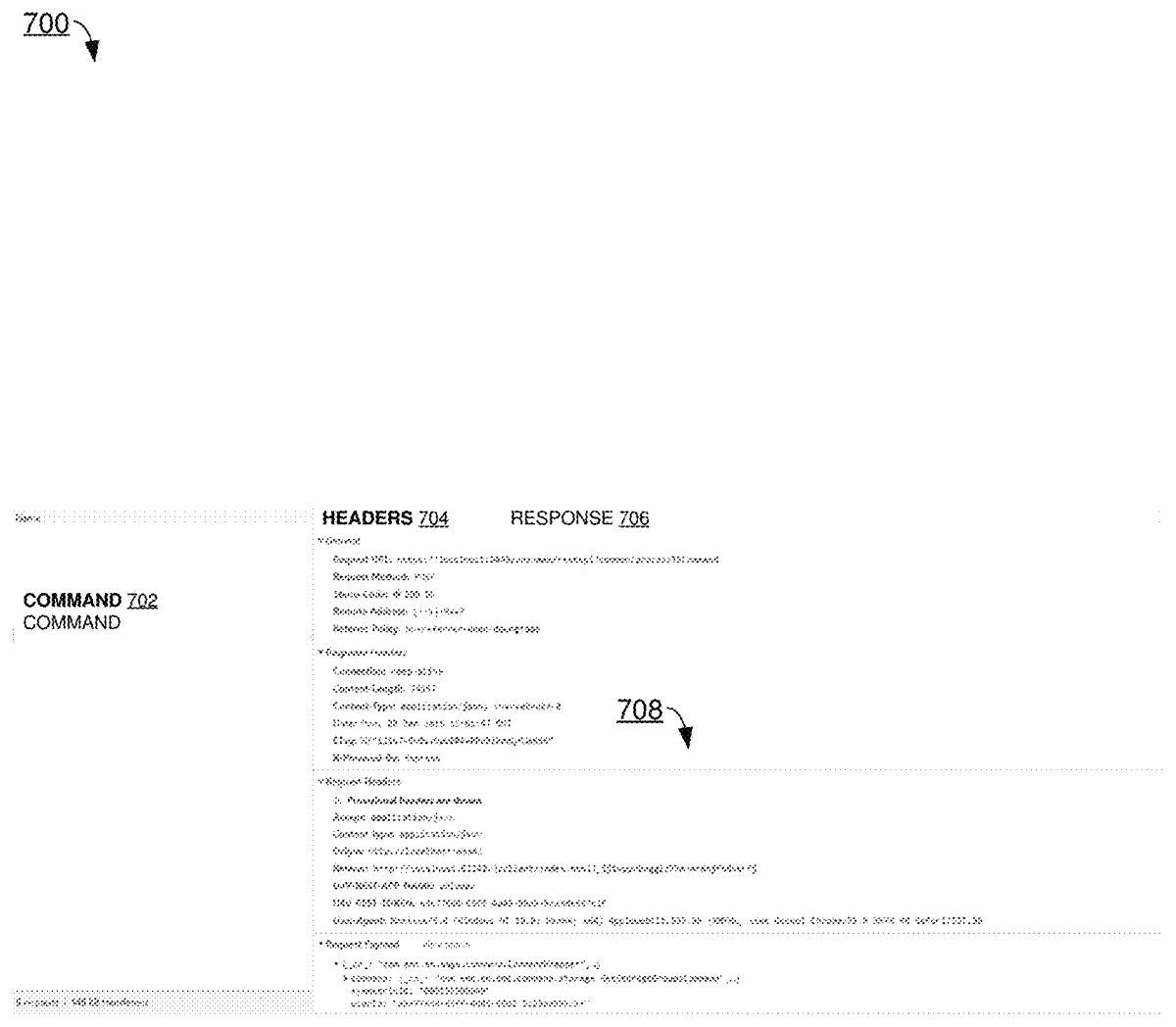

FIG. 7 illustrates an example response 700 generated based on a UI interaction in the example UI interface of FIG. 6, in accordance with certain embodiments of this disclosure. The response of response 700 can be generated by a server in response to a UI interaction in UI 600 (such as an interaction with UI element 302 of UI 300). Response 700 comprises a user interface in which responses list 702 is shown. For a particular response in responses list 702, headers 704 and response 706 can be selected. As depicted in response 700, headers 704 is selected, and headers 708 is depicted as a result.

Figure 8:
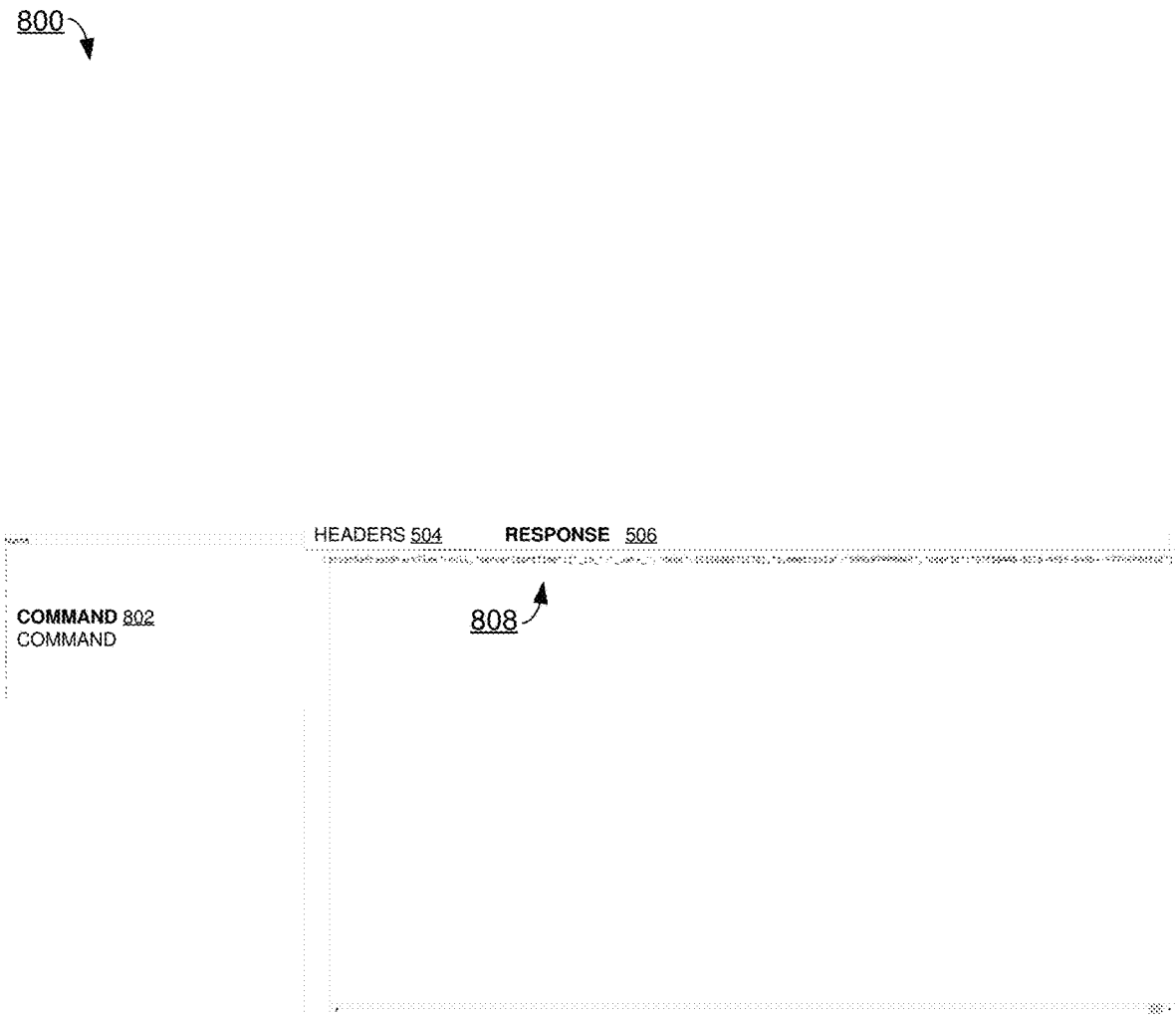
FIG. 8 illustrates more of an example response generated based on a UI interaction in the example UI interface of FIG. 6, in accordance with certain embodiments of this disclosure.

FIG. 8 illustrates more of an example response 800 generated based on a UI interaction in the example UI interface of FIG. 6, in accordance with certain embodiments of this disclosure. As with response 700, response 800 can be generated by a server in response to a UI interaction in UI 300 (such as an interaction with UI element 302 of UI 300). Response 800 comprises a user interface in which responses list 802 is shown. For a particular response in responses list 802, headers 804 and response 806 can be selected. As depicted in response 800, response 806 is selected, and response 806 is depicted as a result. Response 806 and headers 704 can be the respective response and headers to a single response.

Example Process Flows

Figure 9:
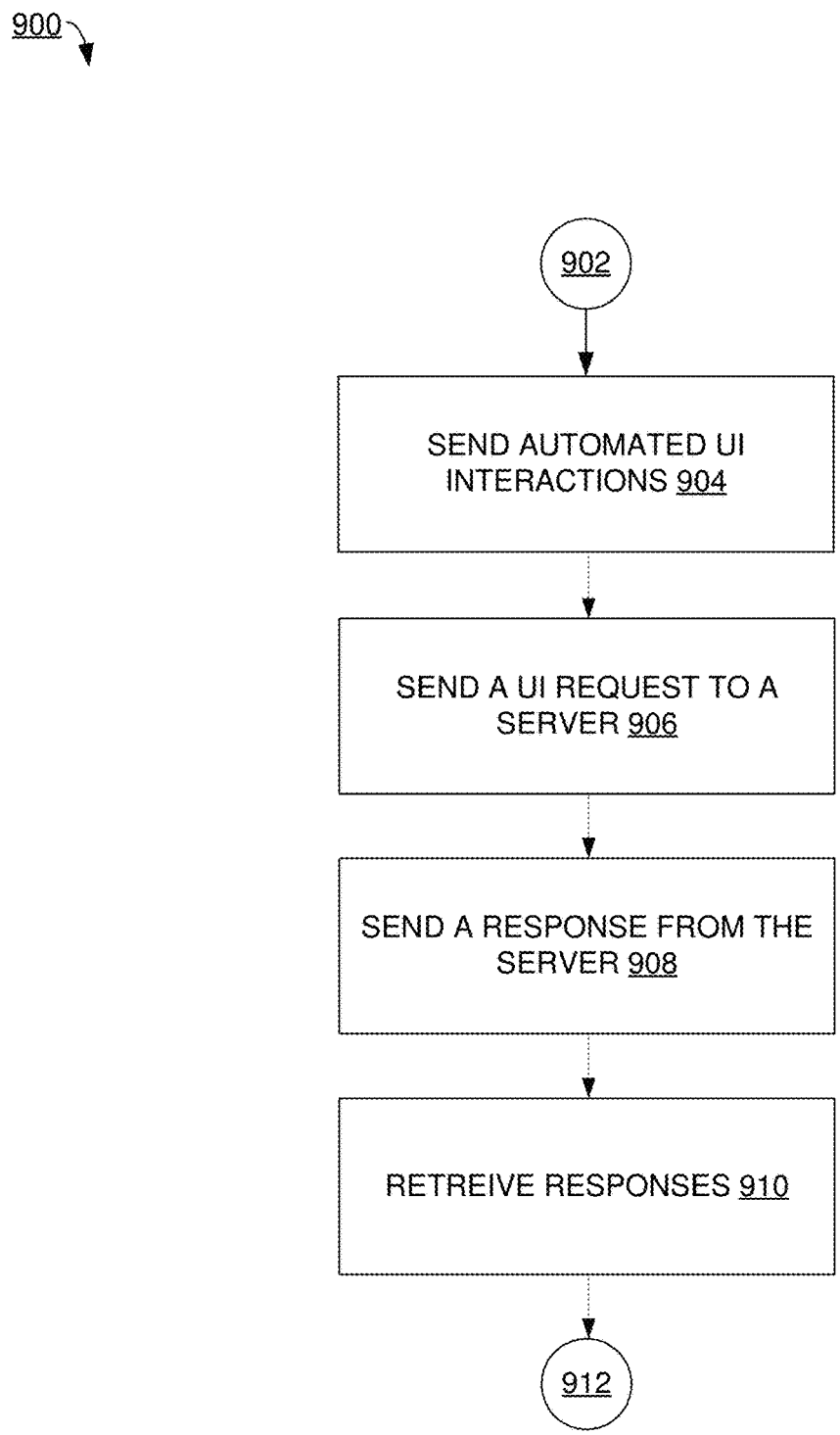
FIG. 9 illustrates an example process flow for generating data in a live application that can be captured for a demo application, in accordance with certain embodiments of this disclosure.

FIG. 9 illustrates an example process flow for generating data in a live application that can be captured for a demo application, in accordance with certain embodiments of this disclosure. It can be appreciated that process flow 900 is an example process flow, and that there can be embodiments that implement more or fewer operations than are depicted in process flow 900, or that implement the operations of process flow 900 in a different order than is depicted in process flow 900.

In some embodiments, process flow 900 can be implemented with demo application population component 108, live application 102, and live application server 104 of FIG. 1, or with live application 202 and automated data collection component 206 of FIG. 2. Process flow 900 begins with 902, and then moves to operation 904.

Operation 904 depicts sending automated UI interactions. These automated UI interactions can be generated by a UI automation framework, and be sent to a live web application UI across a communications network. After operation 904, process flow 900 moves to operation 906.

Operation 906 depicts sending a UI request to a server. This UI request can be generated by a live web application in response to a UI interaction received at a UI of the live web application. This request can comprise, for example, a request to a server to update data displayed in a UI of the live web application. After operation 906, process flow 900 moves to operation 908.

Operation 908 depicts sending a response from the server. This response can be generated based on receiving a UI request, and this response can comprise a response to the request. For example, where the request is to refresh a particular type of data, the response can be updated data of that particular type. After operation 908, process flow 900 moves to operation 910.

Operation 910 depicts retrieving responses. Responses can be transmitted between a live server and a live web application, such as in operation 908, and while this is done, an automated data collection component can monitor these responses as they are transmitted from the server to the application, and gather this information. After operation 910, process flow 900 moves to 912, where process flow 900 ends.

Figure 10:
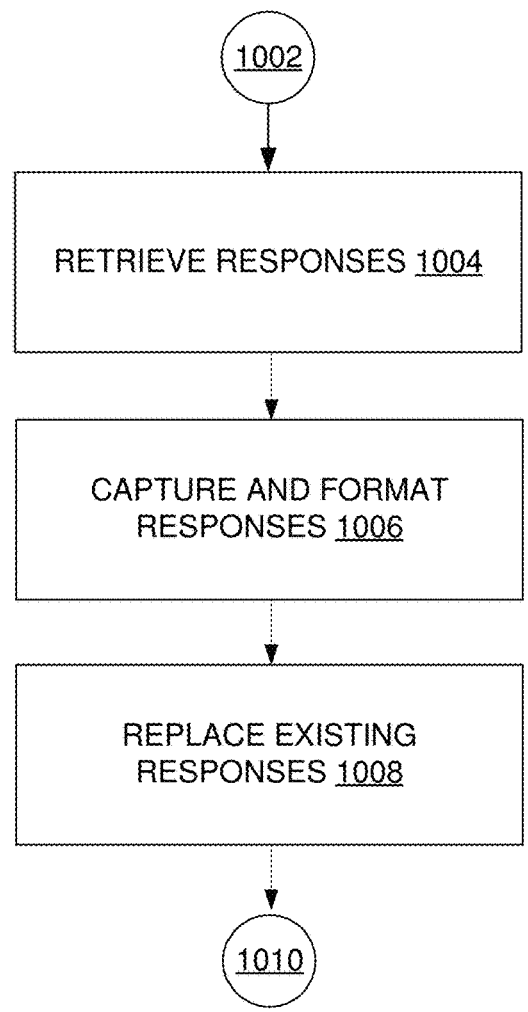
FIG. 10 illustrates an example process flow for processing data from a live application to be suitable for a demo application, in accordance with certain embodiments of this disclosure.

FIG. 10 illustrates an example process flow for processing data from a live application to be suitable for a demo application, in accordance with certain embodiments of this disclosure. It can be appreciated that process flow 1000 is an example process flow, and that there can be embodiments that implement more or fewer operations than are depicted in process flow 1000, or that implement the operations of process flow 1000 in a different order than is depicted in process flow 1000.

In some embodiments, process flow 1000 can be implemented with demo application population component 108 of FIG. 1, or with automated data collection component 206 of FIG. 2. Process flow 1000 begins with 1002, and then moves to operation 1004.

Operation 1004 depicts retrieving responses. In some examples, retrieving responses can be performed in a similar manner as retrieving responses in operation 910 of FIG. 9. After operation 1004, process flow 1000 moves to operation 1006.

Operation 1006 depicts capturing and formatting responses from a live system into new response files for a demo server. In some examples, this can comprise changing a file name of the files from a convention used by the live server to a convention used by the demo server—e.g., a file named "LiveServer_getSymmSrpSloWorkloadInfoCommand.json" can be renamed to "DemoServer_getSymmSrpSloWorkloadInfoCommand.json." In other examples, this can comprise changing a value in the file, such as the name of an attribute in an attribute/value pair. After operation 1006, process flow 1000 moves to operation 1008.

Operation 1008 depicts replacing existing responses. These existing responses can be responses stored by a demo application server, or in a known location that is accessible to a demo server. They can be replaced by an automated demo collection component overwriting the existing files with new files (such as the new response files of operation 1006) by communicating with the demo server or the known location over a communications network.

In some examples, there are no existing responses, and operation 1008 comprises storing the new files of operation 1006 to a demo server or a known location without overwriting files. After operation 1008, process flow 1000 moves to 1010, where process flow 1000 ends.

Figure 11:
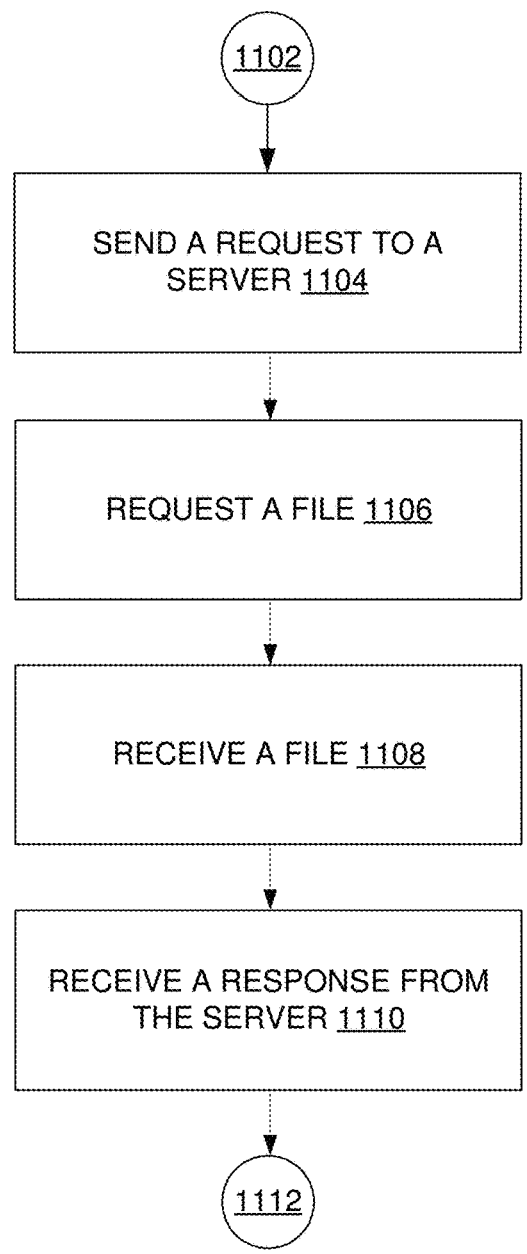
FIG. 11 illustrates an example process flow for a demo application producing data that is generated from a live application, in accordance with certain embodiments of this disclosure.

FIG. 11 illustrates an example process flow for a demo application producing data that is generated from a live application, in accordance with certain embodiments of this disclosure. It can be appreciated that process flow 1100 is an example process flow, and that there can be embodiments that implement more or fewer operations than are depicted in process flow 1100, or that implement the operations of process flow 1100 in a different order than is depicted in process flow 1100.

In some embodiments, process flow 1100 can be implemented with demo application 112 and demo application server 114 of FIG. 1, or with demo application 204 of FIG. 2. Process flow 1100 begins with 1102, and then moves to operation 1104.

Operation 1104 depicts sending a request to a server. This request can be a request made from a demo application in response to receiving user input at a UI of the demo application, and can be sent to a demo server. After operation 1104, process flow 1100 moves to operation 1106.

Operation 1106 depicts requesting a file. This requesting a file can be performed by a demo server in response to receiving the request to the server from operation 1104. Requesting a file can comprise accessing that file at a known location, either within a demo server, or at a location external to the demo server. After operation 1106, process flow 1100 moves to operation 1108.

Operation 1108 depicts receiving a file. Receiving a file in operation 1108 can be a result of requesting a file in operation 1106, and the file received can be the file identified in operation 1106. After operation 1108, process flow 1100 moves to operation 1110.

Operation 1110 depicts receiving a response from the server. This response can be received by the demo application (which can use the response to update its UI), and in some examples can be the file received by the demo server in operation 1108. After operation 1110, process flow 1100 moves to 1112, where process flow 1100 ends.

Figure 12:
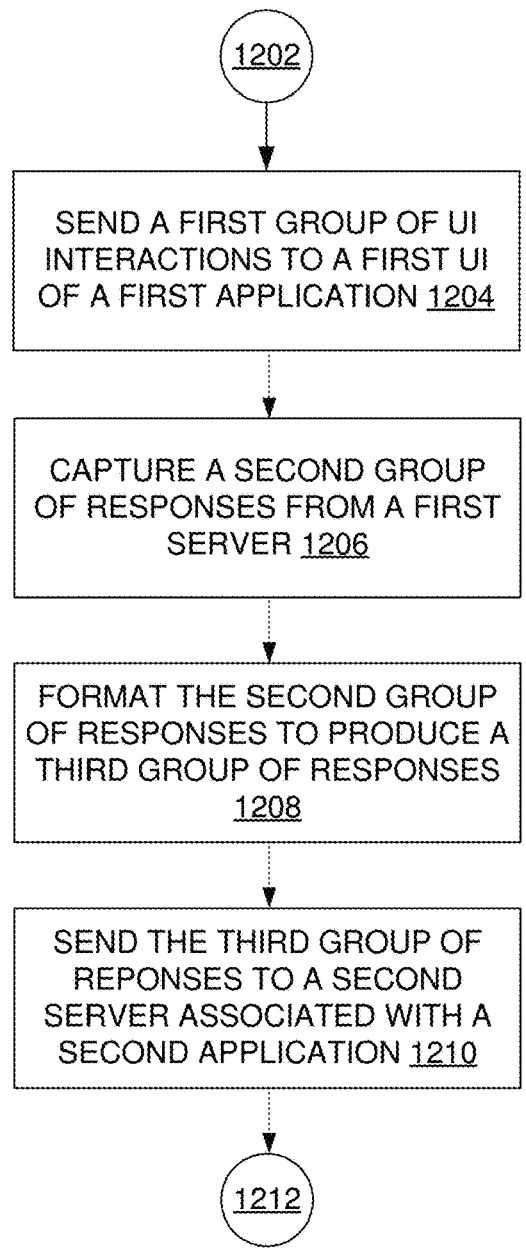
FIG. 12 illustrates an example process flow for capturing data from a live web application to populate a demo application, in accordance with certain embodiments of this disclosure.

FIG. 12 illustrates an example process flow 1200 for capturing data from a live web application to populate a demo application, in accordance with certain embodiments of this disclosure. It can be appreciated that process flow 1200 is an example process flow, and that there can be embodiments that implement more or fewer operations than are depicted in process flow 1200, or that implement the operations of process flow 1200 in a different order than is depicted in process flow 1200.

In some embodiments, process flow 1200 can be implemented with demo application population component 108 of FIG. 1, or with automated data collection component 206 of FIG. 2. Process flow 1200 begins with 1202, and then moves to operation 1204.

Operation 1204 depicts sending a first group of automated UI interactions to a first UI of a first application. In some examples, this can comprise UI automation framework 212 of FIG. 2 sending send automated UI interactions 226 to live web application UI 208.

In some examples, operation 1204 comprises sending a first group of automated interactions to a first application. In some examples, the first application comprises a web application, which can comprise at least part of an application presented in a web page that is rendered by a web browser.

In some examples, operation 1204 comprises, interacting with a fourth group of touch points of the first UI of the first application. These touch points can comprise UI elements that can be clicked on, or otherwise invoked, to cause the web application to perform certain operations. In some examples, interacting with touch points can be performed by UI automation framework 212 when it sends send automated UI interactions 226 to live web application UI 208.

Operation 1206 comprises capturing a second group of responses from a first server that are sent between the first server and the first application in response to the first group of automated UI interactions. In some examples, this comprises information collection and formatting component 214 of FIG. 2 performing retrieve responses 232 when live system server 210 sends response from server 230 to live web application UI.

In some examples, operation 1206 comprises capturing a second group of responses from a first server that are sent between the first server and the first application in response to the first group of automated interactions. In some examples, capturing a second group of responses from a first server that are sent between the first server and a first application in response to a first group of automated interactions directed to the first application.

In some examples, the first application makes a first group of requests to the first server based on the first group of automated interactions directed to the first application. That is, in some examples, a data collection process can send automated UI interactions to a live application, which causes the live application to make requests to a live server. In some examples, the second group of responses are in a first JSON format.

In some examples, a first automated UI interaction of the first group of automated UI interactions, which is invoked to generate a first response of the second group of responses, is identified in the second response. That is, in some examples, rather than associating particular UI interactions that are sent with particular responses that are observed, the response itself can identify the UI interaction that invoked it. For example, where the response comprises a JSON file, this file can comprise a name/value pair that identifies the UI interaction that was invoked to produce this response.

In some examples, the first application is a live application, and the first server is a live server that monitors activity of a first group of computers. In some examples, the second group of responses are both captured by the system and received by the first application. That is, in some examples, the live server can still send the responses to the live application (and they can be received by the live application) when they are also retrieved by an automated data collection process.

In some examples, the first application updates a first user interface of the first application in response to receiving the second group of responses. That is, the live application's UI can change in response to processing responses generated from the automated collection process sending automated UI interactions.

Operation 1208 comprises formatting the second group of responses, from a first format to a second format that is compatible with a second application, to produce a third group of responses. In some examples, operation 1208 comprises formatting the second group of responses into a second JSON format to produce the third group of responses. That is, the responses sent to a demo application can be in a JSON format. In some examples, each response of the third group of responses comprises a separate file. That is, each response can be contained in a separate file, which can be a JSON file.

In some examples, formatting the second group of responses comprises modifying a first attribute in a first attribute-value pair of the second group of responses. That is, a response can comprise one or more attribute-value pairs (sometimes referred to as name-value pairs), and formatting a response can comprise modifying at least one value of at least one attribute-value pair. After operation 1208, process flow 1200 moves to operation 1210.

Operation 1210 depicts sending the third group of responses to a second server that is associated with a second application. In some examples, the second server is configured to respond to input at a second UI of the second application with a first response of the third group of responses. That is, a demo server can use the responses it receives to form responses to a demo application that queries the demo server.

In some examples, the second application is a demonstration application, and the second server is a demonstration server that lacks a configuration to monitor activity for the first group of computers or a second group of computers. That is, in contrast to a live server, a demo server might not be monitoring an actual data center's status and providing responses about the data center's current status, but be hosting mock information (e.g., to depict how certain events are handled), or information from the live server in the past.

In some examples the sending the first group of automated interactions, the capturing, the formatting, and the sending the third group of responses are performed by a first process of the system. That is, in some examples, these functions can be implemented in a single computer application that can be invoked once to invoke all of these functions.

In some examples, the third group of responses replace a fourth group of pre-existing responses on the second server. That is, the demo server can already have response files, and these pre-existing response files can be replaced with new response files that are captured from the live server.

In some examples, a first user interface (UI) element of the first application invokes a first response from the first server, and wherein a second UI element of the second application invokes the first response from the second server. That is, the live application and the demo application can provide the same (or partially the same) functionality. The demo application can serve as a demonstration of functionality provided by the live application.

In some examples, sending the third group of responses to the second server comprises sending the third group of responses to a database that is queried by the second server. That is, in some examples, the demo server makes requests to the demo server for JSON files that the demo server has previously received from the live server (after, in some examples, being formatted or modified).

After operation 1210, process flow 1200 moves to 1212, where process flow 1200 ends.

Example Operating Environments

To provide further context for various aspects of the subject specification, FIG. 13 illustrates a block diagram of a computer 1302 operable to execute the disclosed storage architecture in accordance with aspects described herein. For example, aspects of computer 1302 can be used to implement live application 102, live application server 104, demo application population component 108, demo application 112, and demo application server 114 of FIG. 1. Aspects of computer 1302 can also be used to implement live application 202, demo application 204, and automated data collection component 206 of FIG. 2. In some examples, computer 1302 can implement aspects of the operating procedures of FIGS. 9-12 to provide for capturing data from a live web application to populate a demo application.

FIG. 13 illustrates a block diagram of a computer 1302 operable to execute the disclosed communication architecture. To provide additional context for various aspects of the disclosed subject matter, FIG. 13 and the following discussion are intended to provide a brief, general description of a suitable computing environment 1300 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read-only memory (ROM), electrically erasable programmable read-only memory (EEPROM), flash memory or other memory technology, compact disc read only memory (CD-ROM), digital versatile disc (DVD; sometimes referred to as digital video disc) or other optical disc storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals can refer to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 13, the example environment 1300 for implementing various aspects of the specification includes a computer 1302, the computer 1302 including a processing unit 1304, a system memory 1306 and a system bus 1308. As an example, the component(s), server(s), node(s), cluster(s), system(s), and/or device(s) disclosed herein can each include at least a portion of the computer 1302. The system bus 1308 can couple system components including, but not limited to, the system memory 1306 to the processing unit 1304. The processing unit 1304 can be any of various commercially-available or custom processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 can include ROM 1310 and RAM 1312. A basic input/output system (BIOS) can be stored in a non-volatile memory 1310 such as ROM, erasable programmable read-only memory (EPROM), EEPROM, where the BIOS can contain the basic routines that help to transfer information between elements within the computer 1302, such as during startup. The RAM 1312 can also include a high-speed RAM such as static RAM for caching data, or NVRAM.

The computer 1302 further includes an internal hard disk drive (HDD) 1314, which internal hard disk drive 1314 can also be configured for external use in a suitable chassis (not shown), a magnetic floppy disk drive (FDD) 1316, (e.g., to read from or write to a removable diskette 1318) and an optical disc drive 1320, (e.g., reading a CD-ROM disc 1322 or, to read from or write to other high capacity optical media such as the DVD). The hard disk drive 1314, magnetic disk drive 1316 and optical disc drive 1320 can be connected to the system bus 1308 by a hard disk drive interface 1324, a magnetic disk drive interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the subject disclosure.

The drives and their associated computer-readable storage media can provide nonvolatile storage of data, data structures, computer-executable instructions, and so forth. For the computer 1302, the drives and storage media can accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

Many program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the specification can be implemented with various commercially available operating systems or combinations of operating systems.

A user can enter commands and information into the computer 1302 through one or more wired or wireless input devices, e.g., a keyboard 1338 and/or a pointing device, such as a mouse 1340 or a touch screen or touchpad (not illustrated). These and other input devices can be connected to the processing unit 1304 through an input device interface 1342 that is coupled to the system bus 1308, but can be connected by other interfaces, such as a parallel port, an IEEE 1394 port, a game port, a USB port, an infrared (IR) interface, etc. A monitor 1344 or other type of display device can also be connected to the system bus 1308 via an interface, such as a video adapter 1346.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and can include many or all the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments can be commonplace in offices and companies, and facilitate enterprise-wide computer networks, such as intranets, all of which can connect to a global communications network, e.g., the Internet.

When used in a LAN networking environment, the computer 1302 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, can be connected to the system bus 1308 via the serial port interface 1342. In a networked environment, program modules depicted relative to the computer 1302, or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., desktop and/or portable computer, server, communications satellite, etc. This includes at least Wireless Fidelity (Wi-Fi) and BLUETOOTH wireless technologies. Thus, the communication can be a predefined structure as with a conventional network or simply an ad hoc communication between at least two devices.

Wi-Fi can allow a connection to the Internet from a couch at home, a bed in a hotel room, or a conference room at work, without wires. Wi-Fi can be a wireless technology similar to that used in a cell phone that enables such devices, e.g., computers, to send and receive data indoors and out; anywhere within the range of a base station. Wi-Fi networks can use radio technologies called IEEE 802.11 (a, b, g, n, etc.) to provide secure, reliable, fast wireless connectivity. A Wi-Fi network can be used to connect computers to each other, to the Internet, and to wired networks (which can use an IEEE 802.3 standard or Ethernet). Wi-Fi networks can operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
sending a first group of automated user interface (UI) interactions to a first UI of a first application;
identifying a second group of responses as the second group of responses is transmitted between a first server and the first application, the first server having transmitted the second group of responses in response to receiving the first group of automated UI interactions;
formatting the second group of responses, from a first format to a second format that is compatible with a second application, wherein the formatting comprises modifying a name of an attribute in an attribute-value pair in the second group of responses while preserving a value in the attribute-value pair to produce a third group of responses; and
sending the third group of responses to a second server that is associated with the second application, wherein the second server overwrites a fourth group of preexisting responses with the third group of responses.

2. The system of claim 1, wherein the second server is configured to store the third group of responses, to receive input made at a second UI of the second application, to identify a first response of the third group of responses based on the first response containing a name-value pair a first automated UI interaction of the first group of automated UI interactions used to invoke a corresponding response at the first server, the first automated UI interaction corresponding to the input made at the second UI, and to respond to the input made at the second UI with the first response.

3. The system of claim 1, wherein the second group of responses are in a first JavaScript Object Notation (JSON) format.

4. The system of claim 3, wherein the formatting the second group of responses to produce the third group of responses comprises:
formatting the second group of responses into a second JSON format to produce the third group of responses.

5. The system of claim 1, wherein a first automated UI interaction of the first group of automated UI interactions to the first UI of the first application, which is invoked to generate a first response of the second group of responses, is identified in the second group of responses, the second server being configured to correlate the first automated UI interaction in the third group of responses with an input at a second UI of the second application to determine a first response of the third group of responses to send to the second application.

6. The system of claim 1, wherein the first application is a live application, and the first server is a live server that monitors activity of a first group of devices.

7. The system of claim 6, wherein the second application is a demonstration application, and the second server is a demonstration server that lacks a configuration to monitor activity for the first group of devices or a second group of devices.

8. A method, comprising:
sending, by a system comprising a processor, a first group of automated interactions to a first application;
capturing, by the system, a second group of responses concurrent with transmission of the second group of responses between a first server and the first application, the first server having transmitted the second group of responses in response to the first group of automated interactions being sent to the first application;
formatting, by the system, the second group of responses, from a first format to a second format that is compatible with a second application, to produce a third group of responses, wherein the formatting comprises modifying at least a portion of the second group of responses to adhere to a naming convention of the first application, the first format and the second format each being a JavaScript Object Notation (JSON) format; and
sending, by the system, the third group of responses to a second server that is associated with the second application, wherein the second server overwrites a fourth group of responses with the third group of responses.

9. The method of claim 8, wherein the first application comprises a web application.

10. The method of claim 8, wherein the sending the first group of automated interactions comprises:
interacting with a fourth group of touch points of the first UI of the first application.

11. The method of claim 8, wherein the sending the first group of automated interactions, the capturing, the formatting, and the sending the third group of responses are performed by a first process of the system.

12. The method of claim 8, wherein the second server is configured to respond to requests from the second application with a fourth group of pre-existing responses, and wherein the third group of responses replaces the fourth group of pre-existing responses on the second server.

13. The method of claim 8, wherein the second group of responses are both captured by the system and received by the first application.

14. The method of claim 8, wherein a first user interface (UI) element of the first application invokes a first response from the first server, and wherein a second UI element of the second application invokes the first response from the second server.

15. A non-transitory computer-readable medium comprising instructions that, in response to execution, cause a system comprising a processor to perform operations, comprising:
capturing a first group of responses from a first server while the first group of responses is being transmitted between the first server and a first application in response to a group of automated interactions directed to the first application;
formatting the first group of responses, from a first format to a second format that is compatible with a second application, to produce a second group of responses, wherein the formatting comprises modifying a file name of the second group of responses while preserving a data of the second group of responses; and
sending the second group of responses to a second server that is associated with the second application, wherein the second server overwrites a fourth group of responses with the third group of responses.

16. The non-transitory computer-readable medium of claim 15, wherein the first application makes a first group of requests to the first server based on the group of automated interactions directed to the first application.

17. The non-transitory computer-readable medium of claim 15, wherein each response of the second group of responses comprises a separate file.

18. The non-transitory computer-readable medium of claim 15, wherein the first application updates a first user interface of the first application in response to receiving the first group of responses.

19. The non-transitory computer-readable medium of claim 15, wherein the sending the second group of responses to the second server comprises:
sending the second group of responses to a database that is queried by the second server.

20. The non-transitory computer-readable medium of claim 15, wherein the formatting the second group of responses comprises modifying a first attribute in a first attribute-value pair of the second group of responses while leaving a first value of the first attribute-value pair unmodified, and leaving a file format of the second group of responses unchanged.

* * * * *